United States Patent
Phan Huy

(10) Patent No.: US 9,614,603 B2
(45) Date of Patent: Apr. 4, 2017

(54) METHOD OF TDD PRECODING

(71) Applicant: Orange, Paris (FR)

(72) Inventor: Dinh Thuy Phan Huy, Paris (FR)

(73) Assignee: ORANGE, Paris (FR)

( * ) Notice: Subject to any disclaimer, the term of this patent is extended or adjusted under 35 U.S.C. 154(b) by 344 days.

(21) Appl. No.: 14/370,428

(22) PCT Filed: Dec. 17, 2012

(86) PCT No.: PCT/FR2012/052956
§ 371 (c)(1),
(2) Date: Jul. 2, 2014

(87) PCT Pub. No.: WO2013/102717
PCT Pub. Date: Jul. 11, 2013

(65) Prior Publication Data
US 2015/0016314 A1 Jan. 15, 2015

(30) Foreign Application Priority Data
Jan. 3, 2012 (FR) ...................... 12 50047

(51) Int. Cl.
*H04B 7/06* (2006.01)
*H04B 7/08* (2006.01)
*H04L 5/14* (2006.01)

(52) U.S. Cl.
CPC ........... *H04B 7/061* (2013.01); *H04B 7/0619* (2013.01); *H04B 7/0626* (2013.01);
(Continued)

(58) Field of Classification Search
CPC .... H04B 7/061; H04B 7/0619; H04B 7/0626; H04B 7/0639; H04B 7/0851; H04L 5/1469
See application file for complete search history.

(56) References Cited

U.S. PATENT DOCUMENTS

| 8,699,603 B1* | 4/2014 | Baligh | H04B 7/0413 375/267 |
| 2007/0217540 A1* | 9/2007 | Onggosanusi | H04B 7/0417 375/267 |

(Continued)

FOREIGN PATENT DOCUMENTS

| EP | 2375583 A2 | 10/2011 |
| FR | 2925798 A1 | 6/2009 |
| WO | 2008021396 A2 | 2/2008 |

OTHER PUBLICATIONS

A.D. Dabbagh and D.J. Love "Multiple antenna MMSE-based downlink precoding with quantized feedback or channel mismatch", IEEE Transactions on Communications, vol. 56, No. 11, pp. 1859 to 1868, Nov. 2008.

(Continued)

*Primary Examiner* — Un C Cho
*Assistant Examiner* — Jeremy Costin
(74) *Attorney, Agent, or Firm* — David D. Brush; Westman Champlin & Koehler, P.A.

(57) ABSTRACT

An iterative precoding method for a TDD data transmission system includes a transmitter provided with N transmit antenna(s) (N≥1), and a receiver provided with M receive antennas (M≥2). A series of precoders $L_n$ (n≥0) is defined. Each iteration includes: the transmitter takes account of a predetermined value $n=n_0$ if it is the first iteration, or else a value of n obtained during the preceding iteration; the transmitter sends a triplet of pilot signals precoded with the precoders $L_n$, $L_{n+1}$, and $L_{n+2}$ to the receiver; the receiver estimates the triplet ($T_n$, $T_{n+1}$, $T_{n+2}$) of total data rates that can be achieved corresponding respectively to ($L_n$, $L_{n+1}$, $L_{n+2}$), and deduces therefrom the value of a control command p; the receiver sends a signaling message specifying the value of the control command p; and on receiving the (Continued)

signaling message, the transmitter updates the value of n, by replacing it with the value (n+p).

7 Claims, 4 Drawing Sheets

(52) U.S. Cl.
CPC ......... *H04B 7/0639* (2013.01); *H04B 7/0851* (2013.01); *H04L 5/1469* (2013.01)

(56) References Cited

U.S. PATENT DOCUMENTS

| | | | |
|---|---|---|---|
| 2008/0049709 A1 | 2/2008 | Pan et al. | |
| 2009/0046569 A1* | 2/2009 | Chen ..................... | H04L 1/0029 370/203 |
| 2010/0150266 A1* | 6/2010 | Mondal ................ | H04B 7/0417 375/296 |
| 2010/0302977 A1 | 12/2010 | Phan Huy et al. | |
| 2011/0249655 A1 | 10/2011 | Chen et al. | |
| 2012/0082192 A1* | 4/2012 | Pelletier ................ | H04W 52/42 375/219 |

OTHER PUBLICATIONS

W.J. Higley, P. Roux, and W.A. Kuperman entitled "Relationship between time reversal and linear equalization in digital communications", J. Acoust. Soc. Am., 120 (1), pp. 35 to 37, Jul. 2006.

English translation of the Written Opinion dated Jan. 31, 2013 for corresponding International Application No. PCT/FR2012/052956, filed Dec. 17, 2012.

International Search Report and Written Opinion dated Jan. 31, 2013 for corresponding International Application No. PCT/FR2012/052956, filed Dec. 17, 2012.

Yuanwei Jin et al., "Multiple Antenna Time Reversal Transmission in Ultra-Wideband Communications", Global Telecommunications Conference, 2007. Globecom '07. IEEE, IEEE, Piscataway, NJ, USA, Nov. 1, 2007, pp. 3029-3033, XP031196502.

* cited by examiner

METHOD OF TDD PRECODING

CROSS-REFERENCE TO RELATED APPLICATIONS

This Application is a Section 371 National Stage Application of International Application No. PCT/FR2012/052956, filed Dec. 17, 2012 and published as WO 2013/102717 A1 on Jul. 11, 2013, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The invention relates to the field of radio communications making use of time division duplexing (TDD). More precisely, the invention relates to precoding techniques applied to a data transmission system comprising a transmitter provided with one or more transmit antennas and a receiver provided with at least two receive antennas, thereby constituting a single-input multiple-output (SIMO) system when there is only one transmit antenna or a multiple-input multiple-output (MIMO) system when the system has a plurality of transmit antennas.

BACKGROUND OF THE DISCLOSURE

It should be recalled that the purpose of such precoding is firstly to cause the signals that are transmitted by the transmit antenna(s) to be focused onto the receive antennas, and secondly to maximize the data rate between the transmitter and the receiver, for given power at the transmitter.

Strictly speaking, an aspect of the present invention relates to a single carrier system for transmitting data over a channel that is "flat" in frequency space, i.e. without echoes, also known as "flat fading". In this particular situation, the propagation channel between any transmit antenna and any receive antenna may be represented merely by a complex gain, which is measurable. Consequently, the propagation channel between an array of a plurality of transmit antennas and an array of a plurality of receive antennas can be represented by a measurable complex matrix in which each row corresponds to a receive antenna and each column to a transmit antenna.

Under such circumstances, the aspects of the invention may advantageously be applied to each of the subcarriers of a multicarrier system, such as modulation making use of orthogonal frequency division multiplexing (OFDM), which can be reduced to S independent single-carrier systems (where S is the number of subcarriers), each transmitting over a propagation channel that is flat in frequency space, and each being capable of implementing aspects of the present invention.

In this respect, it should be recalled that the radio signal transmitted by a transmit antenna is subjected to deformation as a function of the propagation conditions between the transmit antenna and a receive antenna. In order to limit this deformation, the signal is distorted before transmission by applying so-called "pre-equalization" coefficients as a function of the characteristics of the propagation channel between the two antennas. In order to be able to do this, it is therefore necessary to be able to determine the characteristics of the propagation channel in the frequency band in question.

Among existing pre-equalization methods, methods making use of the so-called "time reversal" technique stand out because of its reduced complexity, its good performance, and its intrinsic ability to focus a radio wave on a receive antenna. Time reversal makes it possible for the dispersion caused by the propagation channel to be reduced significantly by focusing the energy of the transmitted signal both in time and in space.

Time reversal is a technique that was originally used in the field of soundwaves and that relies on the wave equation being invariant with respect to time reversal. Thus, a time-reversed wave propagates like a direct wave going backwards in time. When a short pulse transmitted from an origin point propagates through a propagation medium, and a portion of this wave as received by a destination point is time reversed prior to being sent back through the propagation medium, then the time-reversed wave converges on the origin point where it reconstitutes a short pulse. The signal picked up at the origin point is practically identical in waveform to the original signal transmitted from the origin point.

The time reversal technique has been applied to radio communications networks for canceling the effect of the propagation channel on the signal received by a receive antenna, in particular by reducing the spread of the channel by concentrating energy on a focal point where the receive antenna is located and by reducing the spread in time, known as the "delay spread" of the received signal, and also for simplifying the processing of received symbols after they have passed through the channel. For this purpose, the signal transmitted by a transmit antenna is pre-equalized by applying coefficients that are obtained on the basis of time reversal of the impulse response of the propagation channel over which the signal is to pass.

With TDD transmission, the reciprocity of the channel enables the transmitter to estimate the channel with the help of pilot signals. The receiver transmits pilot signals, and the transmitter estimates the propagation channel, with the transmitter then using its estimate to pre-equalize the data signal before transmitting it.

SUMMARY

In the context of the present invention, it is assumed that the question of the delay spread of the channel is being handled in one way or another, such that the effective channel obtained after estimation and pre-equalization can be considered to be a channel having no spread in time (a flat fading channel). This applies for example when the precoding method of the invention is applied to one of the subcarriers used in OFDM modulation. Consequently, the quality of a precoding technique as described herein is not its ability to compensate echoes (focusing in time), but its ability to focus a plurality of distinct data streams on distinct receive antennas (focusing in space).

Thus, concerning the above-defined precoding, an iterative time reversal (ITR) precoding technique has been proposed that is based on multiple iterations of the time reversal technique (cf. the article by W. J. Higley, P. Roux, and W. A. Kuperman entitled "Relationship between time reversal and linear equalization in digital communications", J. Acoust. Soc. Am., 120 (1), pp. 35 to 37, July 2006). It can be shown that this method enables an optimum precoder to be obtained, providing a certain optimum number of iterations are performed of the time reversal. Unfortunately, no method is known for determining said optimum number of iterations (other than by trial and error), such that ITR precoding is not used in practice.

An aspect of the present invention thus provides a precoding method for a TDD data transmission system comprising a transmitter provided with N transmit antenna(s), where N≥1, and a receiver provided with M receive antennas, where M≥2. Said method is remarkable in that a series of precoders $L_n$ is defined where n is a positive integer or zero, and $L_n$ is a precoder obtained by applying ($N_0$+nq) iterations, where $N_0$ and q are predetermined integers such that $N_0$≥0 and q>0, of an iterative time reversal precoder for the matrix $\hat{H} \in C^{M \times N}$, which is an estimate of the channel matrix $H \in C^{M \times N}$, and in that, said method being iterative, each iteration of the method comprises the following steps:
said transmitter takes account of a predetermined value n=$n_0$ if it is the first iteration of the method, or else a value of n as obtained during the preceding iteration of the method;
the transmitter sends a triplet of pilot signals precoded with the precoders $L_n$, $L_{n+1}$, and $L_{n+2}$ to the receiver;
as a function of said received triplets of pilot signals, the receiver estimates the triplet ($T_n$, $T_{n+1}$, $T_{n+2}$) of total data rates that can be achieved corresponding respectively to ($L_n$, $L_{n+1}$, $L_{n+2}$), and deduces therefrom a control command p of value that is determined as follows:
p=+1 if $T_{n+2}$=max ($T_n$, $T_{n+1}$, $T_{n+2}$);
p=−1 if $T_n$=max ($T_n$, $T_{n+1}$, $T_{n+2}$); and
p=0 if $T_{n+1}$=max ($T_n$, $T_{n+1}$, $T_{n+2}$):
the receiver sends a signaling message to the transmitter specifying said value of the control command p; and
on receiving said signaling message, the transmitter updates the value of n, by replacing it with the value (n+p).

Thus, the successive iterations cause the transmission system to converge automatically on a precoder $L_{n+1}$ such that the total data rate (i.e. summed over the receive antennas) $T_{n+1}$ associated with the pilot signals precoded with the precoder $L_{n+1}$ is the maximum possible data rate, given the signal-to-noise ratio of the pilot channel.

By means of these provisions, an optimum ITR precoder is determined dynamically. Furthermore, and advantageously, performance requires only relatively little calculation.

Furthermore, it should be recalled that in theory the optimum precoder for a system having the constraint of transmitting one stream per receive antenna is the minimum mean square error (MMSE) precoder as studied for example in the article by A. D. Dabbagh and D. J. Love entitled "Multiple antenna MMSE-based downlink precoding with quantized feedback or channel mismatch", IEEE Transactions on Communications, Vol. 56, No. 11, pp. 1859 to 1868, November 2008). Nevertheless, the effectiveness of that MMSE precoder relies on accurately estimating and predicting the signal-to-noise ratio (SNR), i.e. the ratio of the power received (without precoding) by the receiver averaged over the receive antennas and divided by the noise of the receiver; unfortunately, it is difficult to make this estimate, such that in practice the SNR is poorly estimated, a phenomenon referred to as "SNR mismatch", and prevents the expected performance from being obtained. Furthermore, that MMSE technique requires matrix type operations that, as is well known, are operations requiring a large amount of calculation.

Advantageously, it is possible to determine an optimum precoder without requiring an accurate estimate of the signal-to-noise ratio and without requiring matrix inversion to be performed.

According to particular characteristics, when the transmitter has data to transmit, it uses for this transmission a data precoder G obtained by applying to the current pilot precoder $L_{n+1}$ an offset δ of iterative time reversal iterations, said offset δ being a function of a power difference θ dB defined as follows:

$$\theta = 10 \, \log_{10}\left(\frac{P_{data}}{P_{pilots}}\right)$$

where $P_{data}$ and $P_{pilots}$ are the transmission powers of the data channel and of the pilot channel respectively.

By means of these provisions, it is easy at any moment when it is desired to transmit data to determine an optimum data precoder G on the basis of the current pilot precoder $L_{n+1}$.

According to even more particular characteristics, said offset δ is calculated as follows:

$$\delta = E\left[\frac{\theta}{f}\right]$$

where E designates the integer portion, and f is a predetermined increase of SNR in dB associated with applying a single iteration of the iterative time reversal.

By means of these provisions, it is very easy to calculate this offset δ.

Correspondingly, an aspect of the invention provides various devices.

Thus, firstly, it provides a transmitter in a TDD data transmission system, said transmitter being provided with N transmit antenna(s), where N≥1. Said transmitter is remarkable in that it comprises means for storing or generating a series of precoders $L_n$ where n is a positive integer or zero, and $L_n$ is the precoder obtained by applying ($N_0$+nq) iterations, where $N_0$ and q are predetermined integers such that $N_0$≥0 and q>0, of an iterative time reversal precoder for the matrix $\hat{H} \in C^{M \times N}$, which is an estimate of the channel matrix $H \in C^{M \times N}$, where M≥2 designates the number of receiver antennas of any receiver, and in that it comprises means for:
storing a value of n;
sending a triplet of pilot signals precoded with the precoders $L_n$, $L_{n+1}$, and $L_{n+2}$ to said receiver;
receiving from the receiver a signaling message specifying a value for a control command p; and
on receiving said signaling message, updating the value of n by replacing it with the value (n+p).

According to particular characteristics, said transmitter further comprises means for implementing a data precoder G obtained by applying to the current pilot precoder $L_{n+1}$ an offset δ of iterations of the iterative time reversal, said offset δ being a function of a power difference θ dB defined as follows:

$$\theta = 10 \, \log_{10}\left(\frac{P_{data}}{P_{pilots}}\right)$$

where $P_{data}$ and $P_{pilots}$ are the transmission powers of the data channel and of the pilot channel, respectively.

According to still more particular characteristics, said offset δ is calculated as follows:

$$\delta = E\left[\frac{\theta}{f}\right]$$

where E designates the integer portion, and f is a predetermined increase in the signal-to-noise ratio in dB associated with applying a single iteration of the iterative time reversal.

Secondly, an aspect of the invention also provides a receiver in a TDD data transmission system, said receiver being provided with M receive antennas, where M≥2. Said receiver is remarkable in that it comprises means for:

receiving from a transmitter a triplet of pilot signals precoded with precoders $L_n$, $L_{n+1}$, and $L_{n+2}$;

as a function of said triplet of received pilot signals, estimating the triplets $(T_n, T_{n+1}, T_{n+2})$ of achievable total rates corresponding respectively to $(L_n, L_{n+1}, L_{n+2})$, and deducing therefrom a control command p of value that is determined as follows:

p=+1 if $T_{n+2}$=max $(T_n, T_{n+1}, T_{n+2})$;
p=−1 if $T_n$=max $(T_n, T_{n+1}, T_{n+2})$; and
p=0 if $T_{n+1}$=max $(T_n, T_{n+1}, T_{n+2})$; and sending a signaling message to said transmitter giving said value of the control command p.

According to other particular characteristics, it is possible to make any of the devices briefly summarized above in the context of an electronic circuit.

The advantages made available by these devices are essentially the same as the advantages made available by the corresponding methods briefly summarized above.

An aspect of the invention also provides a computer program downloadable from a communications network and/or stored on a computer readable medium and/or executable by a microprocessor. The computer program is remarkable in that it comprises instructions for executing steps of any of the precoding methods briefly summarized above, when executed on a computer.

The advantages made available by these devices and this computer program are essentially the same as those made available by said methods.

Other aspects and advantages of aspects of the invention appear on reading the following detailed description of particular embodiments given as non-limiting examples.

BRIEF DESCRIPTION OF THE DRAWINGS

The description refers to the accompanying drawings, in which.

DETAILED DESCRIPTION OF THE ILLUSTRATIVE EMBODIMENTS

Figure 1A:
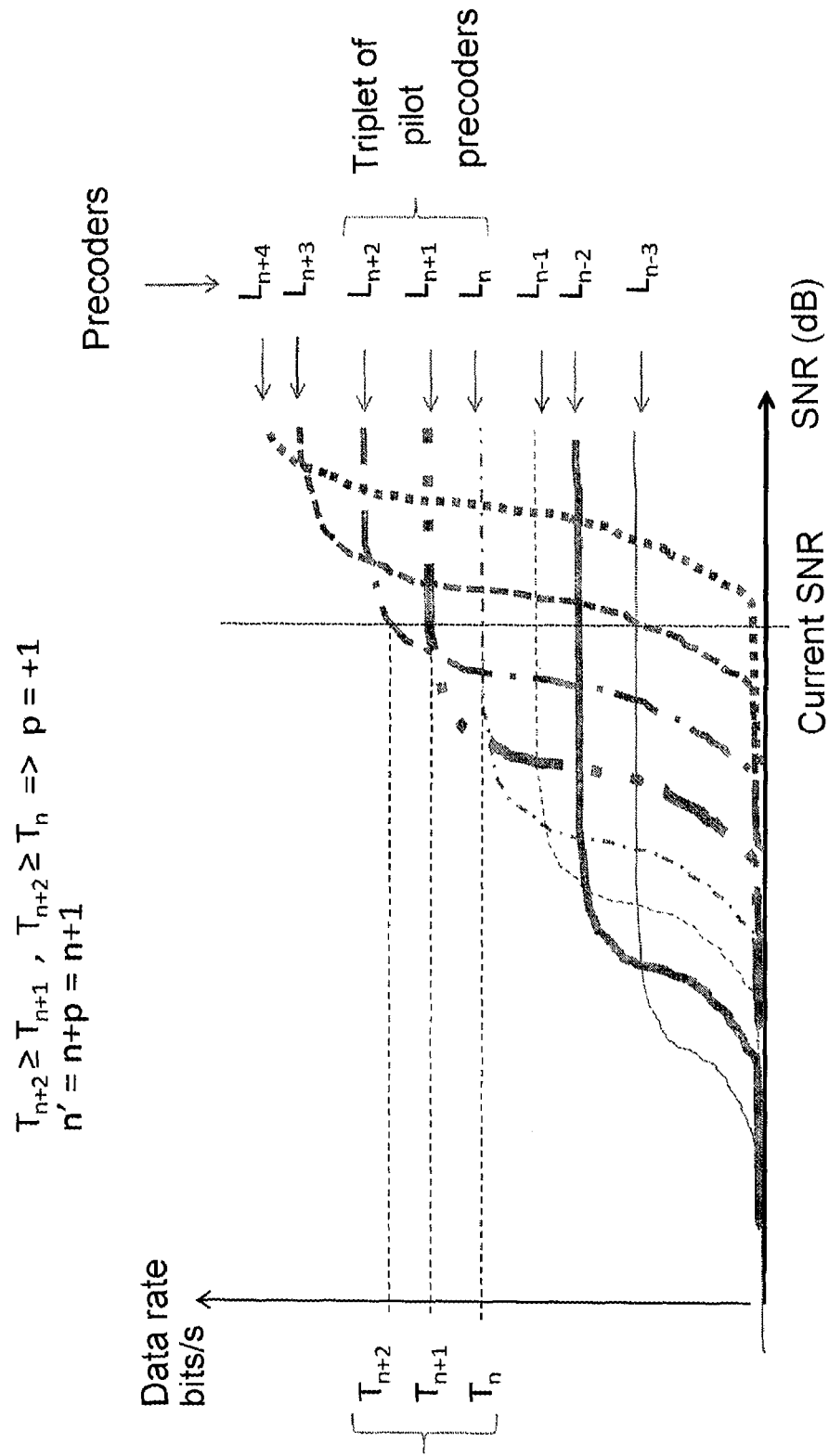
FIG. 1a is a graph plotting data rate as a function of SNR for a series of precoders during iteration of an implementation of a method according to an aspect of the invention, in which the control command received from the receiver is of value (+1)

Consideration is given to a data transmission system comprising a transmitter provided with N transmit antenna(s), where N≥1, and a receiver provided with M receive antennas, where M≥2.

As explained above, the receiver initially sends pilot signals to the transmitter, thereby enabling the transmitter in conventional manner to estimate the channel. It is recommended to repeat this operation as often as necessary as a function of possible variations in the channel over time.

The notation $\hat{H} \in \mathbb{C}^{M \times N}$ designates the matrix obtained by estimating the channel matrix $H \in \mathbb{C}^{M \times N}$.

To begin with there follows a description of a conventional method of constructing an iterative time reversal precoder, in two variant embodiments.

The first variant relates to an ITR precoder that is said to be "without normalization".

Let $A_k \in \mathbb{C}^{M \times N}$ be the iterative time reversal precoder at iteration k (where k is a positive integer or zero) of the iterative time reversal. Let $$A_{norm} = \frac{\hat{H}}{\alpha},$$

where α is a normalization factor such that the matrix $(A_{norm} A_{norm}^h - I)$, where the exponent "h" designates the conjugate transpose, and "I" designates the identity matrix, has eigen values that are positive or zero, but strictly less than one; by way of example it is possible to use:

$$\alpha = \sqrt{\text{trace}(\hat{H}\hat{H}^h)}$$

For k=0, set: $A_0 = A_{norm}$.
For k∈N, with k≥1, set:

$$A_k = A_{k-1} + A_{k-1}(I - \hat{H} A_{k-1})$$

Advantageously, if this method is called for a value k', and if it was previously called for a value k<k' and $A_k$ was kept, then $A'_{k'}$ can be deduced from $A_k$ quickly, i.e. in a small number (k'−k) of iterations.

The drawback of this variant is that variations of $A_k$ with k are slow; where this is due to the value selected for α.

The second variant relates to an ITR precoder that is said to be "with normalization". It differs from the first variant solely in the normalization factor.

For k=0, set: $A_0 = A_{norm}$.
For k∈N, with k≥1, set:

$$A_k = A_{k-1} + A_{k-1}\left(I - \frac{1}{\alpha_k}\hat{H}A_{k-1}\right), \text{ where } \alpha_k = \sqrt{\text{trace}\left(\hat{H}A_{k-1}\right)}$$

Compared with the above variant, the advantage of this variant is that variations of $A_k$ with k are faster.

There follows a description of a precoding method in an implementation of the invention.

Firstly, an ITR precoder $A_k$ is selected for the matrix $\hat{H} \in \mathbb{C}^{M \times N}$ relating to the channel under consideration, which precoder may for example be defined using one of the variants described above. Thereafter, a series of precoders $L_n$ is defined where $L_n$ is the precoder $A_k$ such that:

$$k = N_0 + nq$$

where n is a positive integer or zero, and $N_0$ and q are predetermined integers such that $N_0 \geq 0$ and $q > 0$.

Since the method is iterative, there follows a description of the steps constituting one iteration of the method (not to be confused with an iteration of the time reversal when constructing an ITR precoder).

On initializing the method, the index n is initialized with a predetermined value: $n = n_0$. Thereafter, for each iteration of the method, n starts with the value obtained during the preceding iteration of the method.

During a step E1, the transmitter sends separately to the receiver a triplet of pilot signals that have been precoded with the precoders $L_n$, $L_{n+1}$, and $L_{n+2}$, where such separate transmission may be performed in three successive time symbols, for example.

During a step E2, and as a function of the received triplet of pilot signals, the receiver estimates the total data rate (i.e. summed over all of the receive antennas) that can currently be achieved $(T_n, T_{n+1}, T_{n+2})$ corresponding respectively to $(L_n, L_{n+1}, L_{n+2})$. Thereafter, the receiver determines which of these three data rates is the greatest, i.e. $\max(T_n, T_{n+1}, T_{n+2})$.

The receiver then performs the following tests and from them it deduces a control command p of value that is determined as follows:

p=+1 if $T_n \leq T_{n+2}$, and $T_{n+1} \leq T_{n+2}$ i.e. $T_{n+2} = \max(T_n, T_{n+1}, T_{n+2})$ p=−1 if $T_n \geq T_{n+1}$, and $T_n \geq T_{n+2}$ i.e. $T_n = \max(T_n, T_{n+1}, T_{n+2})$; and p=0 if $T_{n+1} \geq T_n$, and $T_{n+1} \geq T_{n+2}$ i.e. $T_{n+1} = \max(T_n, T_{n+1}, T_{n+2})$.

During a step E3, the receiver sends a signaling message to the transmitter specifying the value as determined in this way for the control command p.

During a step E4, on receiving the message containing the control command p, the transmitter applies a "precoding offset": the transmitter updates the value of the index n by replacing it with the value (n+p).

The method then moves on to the following iteration with the updated value for n, and so on.

It should be observed that advantageously the receiver does not necessarily need to know the value of the signal-to-interference-plus-noise ratio (SINR) of the precoded pilot signals in order to estimate the associated data rate ($T_n$, $T_{n+1}$, $T_{n+2}$). Even if the receiver does indeed make use of the values of the SINRs in order to estimate the data rate (in a conventional method), this estimation may be performed in less accurate manner without harm since it is used only for the purpose of determining which is the greatest of the three data rates $T_n$, $T_{n+1}$, $T_{n+2}$; actually, in such a method, the total data rate is estimated as follows (Shannon's formula):

$$T = \sum_{m=1}^{M} \log(1 + \hat{y}_m) / \log(2)$$

where $\hat{y}_m$ is the SINR for the precoded pilot signal on receive antenna number m, where m=1, . . . , M (it should be observed that the interference between the streams due to simultaneous transmission of a plurality of distinct streams is taken into account in this estimate).

The above-described iterative steps are illustrated below by means of two examples described with reference to the accompanying figures. Each of these figures shows the same series of curves, with each of these curves representing, for given precoding, the total data rate associated with the precoded pilot signals, as measured by the receiver, as a function of the SNR of the pilot channel averaged over the receive antennas.

In a first example in FIG. 1a, given the current SNR (which it is repeated has a value that need not necessarily be determined), the receiver observes that $T_n \leq T_{n+2}$ and $T_{n+1} \leq T_{n+2}$. It therefore sends the control command p=+1 to the transmitter. The transmitter increments the value of the index n so that it becomes n'=n+1.

Figure 1B:
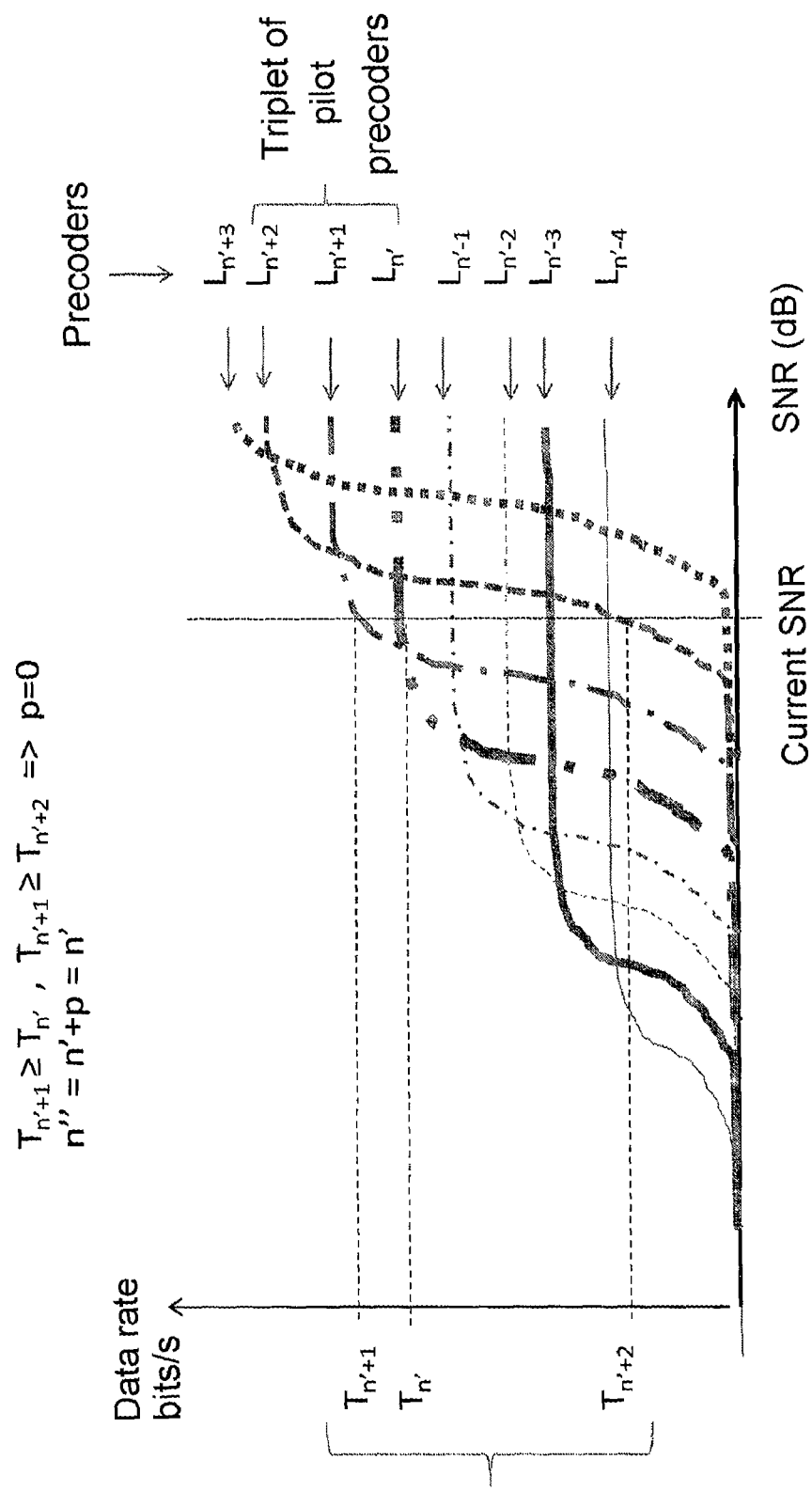
FIG. 1b is a graph showing the iteration following the iteration shown in FIG. 1a, and in which the control command received from the receiver is of value (0)

FIG. 1b shows the iteration following the iteration shown in FIG. 1a. The curves are labeled as a function of n'. The receiver receives a triplet of pilot signals precoded by means of precoders $L_{n'}$, $L_{n'+1}$, and $L_{n'+2}$. The receiver thus observes that $T_{n'+1} \geq T_{n'}$ and $T_{n'+1} \geq T_{n'+2}$. It therefore sends the control command p=0 to the transmitter. The transmitter increments the value of the index which becomes n''=n', i.e. specifically, on leaving the iteration, this value remains the same as on entering it.

Figure 2A:
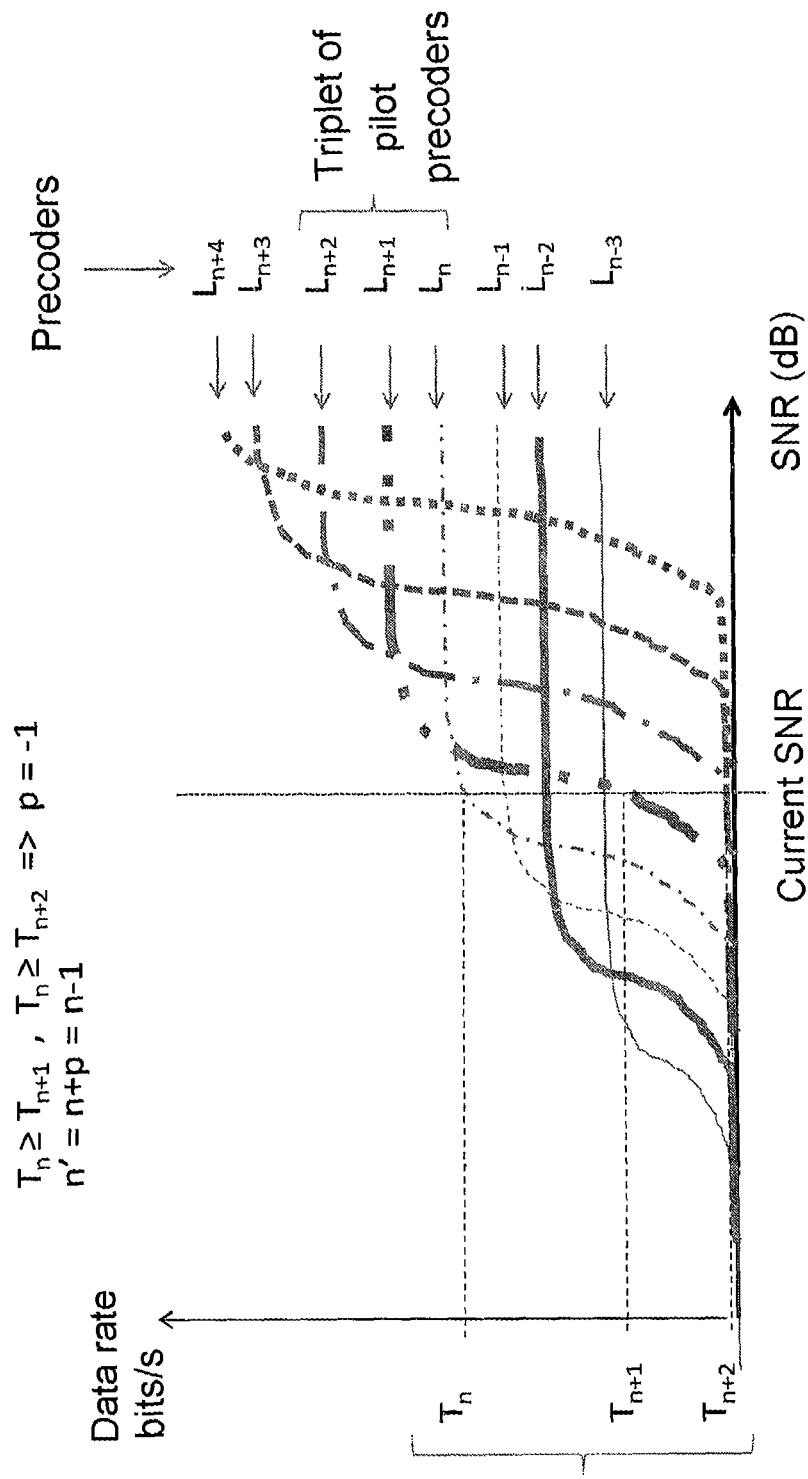
FIG. 2a is a graph showing the data rate as a function of SNR for a series of precoders during an iteration of an implementation of the method according to an aspect of the invention in which the control command received from the receiver is of value (−1)

In a second example, shown in FIG. 2a, given the current SNR, the receiver observes that $T_n \geq T_{n+1}$ and $T_n \geq T_{n+2}$. It therefore sends the control command p=−1 to the transmitter. The transmitter increments the value of the index n which thus becomes n'=n−1.

Figure 2B:
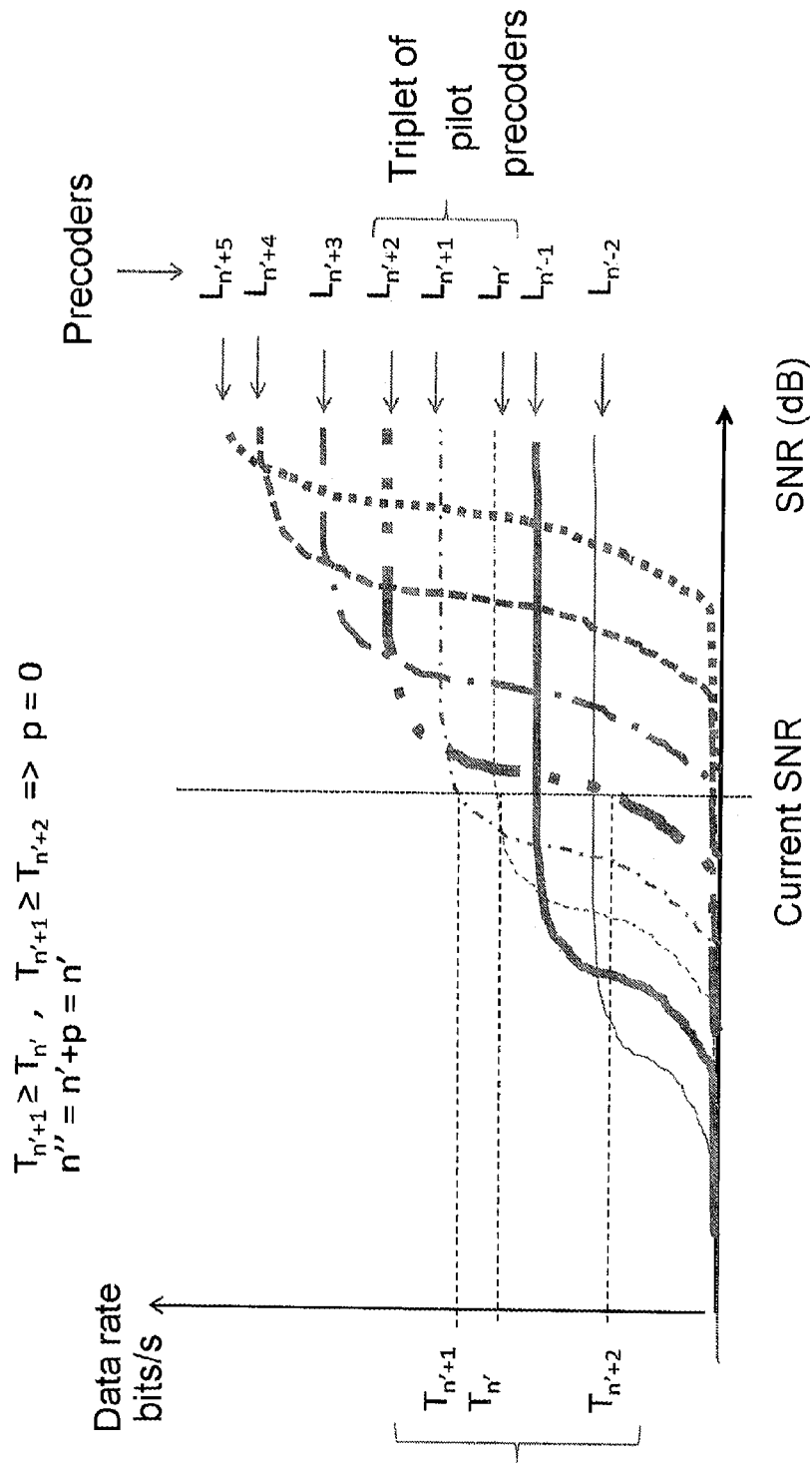
FIG. 2b is a graph showing the iteration following the iteration shown in FIG. 2a, and in which the control command received from the receiver is of value (0).

FIG. 2b shows the iteration following that shown in FIG. 2a. The curves are labeled as a function of n'. The receiver receives a triplet of pilot signals precoded by means of the precoders $L_{n'}$, $L_{n'+1}$, and $L_{n'+2}$. The receiver then observes that $T_{n'+1} \geq T_{n'}$ and $T_{n'+1} \geq T_{n'+2}$. It therefore sends the control command p=0 to the transmitter. The transmitter increments the value of the index which becomes n''=n', i.e. specifically, on leaving the iteration, this value remains the same as on entering it.

When the transmitter has data to transmit, it determines a data precoder G obtained by applying to the current pilot precoder $L_{n+1}$ an offset of $\delta$ iterative time reversal iterations, with this being done for the purpose of taking account of the fact that the pilot signals and the data signals do not necessarily have the same power.

One example of how the offset $\delta$ is determined is as follows. A power difference $\theta$ dB is defined as follows:

$$\theta = 10 \log_{10}\left(\frac{P_{data}}{P_{pilots}}\right)$$

where $P_{data}$ and $P_{pilots}$ are the transmission powers of the data channel and of the pilot channel respectively. In other words:

$\theta$=(SNR of the channel for data)−(SNR of the channel for pilots).

It should be observed that the value of the power difference $\theta$ is easy for the transmitter to determine since it is the transmitter that controls the powers $P_{data}$ and $P_{pilots}$.

According to particular characteristics, consideration is given to a predetermined increase f (in dB) of the SNR associated with applying a single iteration of the iterative time reversal. The value of this increase f may be determined by means of simulations prior to performing the implementation of the method of the invention. Said offset $\delta$ can then be calculated conveniently as follows:

$$\delta = E\left[\frac{\theta}{f}\right]$$

where E designates the integer portion.

As mentioned above, an aspect of the present invention also relates to a computer system performing the above-described precoding control method. In conventional manner, the computer system comprises a central processor unit using signals to control a memory, together with an input unit and an output unit.

Furthermore, the computer system may be used to execute a computer program including instructions for performing the precoding method of the invention.

An aspect of the invention also provides a computer program downloadable from a communications network and including instructions for executing steps of a precoding method of the invention when executed on a computer. The computer program may be stored on a computer readable medium and may be executable by a microprocessor.

The program may use any programming language, and be in the form of source code, object code, or code intermediate between source code and object code, in a partially compiled form or in any other desirable form.

An aspect of the invention also provides a computer-readable data medium that may be permanent or partially or completely removable, and that includes instructions of a computer program as mentioned above.

The data medium may be any entity or device capable of storing the program. For example, the medium may comprise storage means such as a read only memory (ROM), e.g. a compact disk (CD) ROM or a microelectronic circuit ROM, or indeed magnetic recording means, such as a hard disk, or a universal serial bus (USB) flash drive.

Furthermore, the data medium may be a transmissible medium such as an electrical or optical signal that may be conveyed via an electrical or optical cable, by radio, or by other means. The computer program of the invention may in particular be downloaded from an Internet type network.

In a variant, the data medium may be an integrated circuit in which the computer program is incorporated, the circuit being adapted to execute or to be used in the execution of the method of the invention.

Although the present disclosure has been described with reference to one or more examples, workers skilled in the art will recognize that changes may be made in form and detail without departing from the scope of the disclosure and/or the appended claims.

The invention claimed is:

1. A precoding method for a time division duplexing (TDD) system comprising:
   performing the following acts in the TDD system, which comprises a transmitter provided with N transmit antenna(s), where N≥1, and a receiver provided with M receive antennas, where M≥2, and wherein a series of precoders $L_n$ is defined where n is a positive integer or zero, and $L_n$ is a precoder obtained by applying ($N_0$+nq) iterations, where $N_0$ and q are predetermined integers such that $N_0$≥0 and q>0, of an iterative time reversal precoder for the matrix $\hat{H} \in C^{M \times N}$, where C designates the body of complex numbers, which is an estimate of the channel matrix $H \in C^{M \times N}$, and wherein said acts are iterative and each iteration comprises:
   said transmitter takes account of a predetermined value n=$n_0$ if it is the first iteration of the method, or else a value of n as obtained during the preceding iteration of the method;
   the transmitter sends a triplet of pilot signals precoded with the precoders $L_n$, $L_{n+1}$, and $L_{n+2}$ to the receiver;
   as a function of said received triplets of pilot signals, the receiver estimates the triplet ($T_n$, $T_{n+1}$, $T_{n+2}$) of total data rates that can be achieved corresponding respectively to ($L_n$, $L_{n+1}$, $L_{n+2}$), and deduces therefrom a control command p of value that is determined as follows:
   p=+1 if $T_{n+2}$=max ($T_n$, $T_{n+1}$, $T_{n+2}$);
   p=−1 if $T_n$=max ($T_n$, $T_{n+1}$, $T_{n+2}$); and
   p=0 if $T_{n+1}$=max ($T_n$, $T_{n+1}$, $T_{n+2}$);
   the receiver sends a signaling message to the transmitter specifying said value of the control command p; and
   on receiving said signaling message, the transmitter updates the value of n, by replacing it with the value (n+p).

2. The precoding method according to claim 1, wherein the transmitter has data to transmit, it uses for this transmission a data precoder G obtained by applying to the current pilot precoder $L_{n+1}$ an offset δ of iterative time reversal iterations, said offset δ being a function of a power difference θ dB defined as follows:

$$\theta = 10 \, \log_{10}\left(\frac{P_{data}}{P_{pilots}}\right)$$

where $P_{data}$ and $P_{pilots}$ are the transmission powers of the data channel and of the pilot channel respectively.

3. The precoding method according to claim 2, wherein said offset δ is calculated as follows:

$$\delta = E\left[\frac{\theta}{f}\right]$$

where E designates an integer part, and f is a predetermined increase of signal-to-noise ratio (SNR) in dB associated with applying a single iteration of the iterative time reversal.

4. A transmitter in a time division duplexing (TDD) system, said transmitter comprising:
   N transmit antenna(s), where N≥1, and
   a processor configured to store or generate a series of precoders $L_n$ where n is a positive integer or zero, and $L_n$ is the precoder obtained by applying ($N_0$+nq) iterations, where $N_0$ and q are predetermined integers such that $N_0$≥0 and q>0, of an iterative time reversal precoder for the matrix $\hat{H} \in C^{M \times N}$, where C designates the body of complex numbers, which is an estimate of the channel matrix $H \in C^{M \times N}$, where M≥2 designates the number of receiver antennas of a receiver, and the processor is further configured to:
   store a value of n;
   send a triplet of pilot signals precoded with the precoders $L_n$, $L_{n+1}$, and $L_{n+2}$ to said receiver;
   receive from the receiver a signaling message specifying a value for a control command p;
   on receiving said signaling message, update the value of n by replacing it with the value (n+p);
   implement a data precoder G obtained by applying to the current pilot precoder $L_{n+1}$ an offset δ of iterations of the iterative time reversal, said offset δ being a function of a power difference θ dB defined as follows:

$$\theta = 10 \log_{10}\left(\frac{P_{data}}{P_{pilots}}\right)$$

where $P_{data}$ and $P_{pilots}$ are the transmission powers of the data channel and of the pilot channel, respectively.

5. The transmitter according to claim 4, wherein said offset δ is calculated as follows:

$$\delta = E\left[\frac{\theta}{f}\right]$$

where E designates an integer part, and f is a predetermined increase in the signal-to-noise ratio in dB associated with applying a single iteration of the iterative time reversal.

6. An electronic circuit, wherein it comprises the transmitter according to claim 4.

7. A non-transitory computer-readable medium having stored thereon a computer program including a series of program code instructions for executing a precoding method for a time division duplexing (TDD) system, when said program is executed in a computer, wherein the method comprises:

performing the following acts by a transmitter in the TDD system, wherein the TDD system comprises the transmitter which is provided with N transmit antenna(s), where N≥1, and a receiver which is provided with M receive antennas, where M≥2, and wherein a series of precoders $L_n$ is defined where n is a positive integer or zero, and $L_n$ is a precoder obtained by applying ($N_0$+nq) iterations, where $N_0$ and q are predetermined integers such that $N_0 \geq 0$ and q>0, of an iterative time reversal precoder for the $\hat{H} \in C^{M \times N}$, where C designates the body of complex numbers, which is an estimate of the channel matrix, $H \in C^{M \times N}$, wherein said acts are iterative, and each iteration comprises:

said transmitter takes account of a predetermined value n=$n_0$ if it is the first iteration of the method, or else a value of n as obtained during the preceding iteration of the method;

the transmitter sends a triplet of pilot signals precoded with the precoders $L_n$, $L_{n+1}$, and $L_{n+2}$ to the receiver;

the transmitter receives from the receiver a signaling message specifying a value of a control command p, wherein the receiver is deduced by the receiver, which estimates as a function of said received triplets of pilot signals, the triplet ($T_n$, $T_{n+1}$, $T_{,+2}$) of total data rates that can be achieved corresponding respectively to ($L_n$, $L_{n+1}$, $L_{,+2}$), and deduces therefrom the control command p of value that is determined as follows:

p=+1 if $T_{n+2}$=max ($T_n$, $T_{n+1}$, $T_{n+2}$);
p=−1 if $T_n$=max ($T_n$, $T_{n+1}$, $T_{n+2}$); and
p=0 if $T_{n+1}$=max ($T_n$, $T_{n+1}$, $T_{n+2}$); and on receiving said signaling message, the transmitter updates the value of n, by replacing it with the value (n+p).

* * * * *